United States Patent [19]

Eckler et al.

[11] 4,297,443
[45] Oct. 27, 1981

[54] METHOD FOR POLYURETHANE FOAM USING A TRI-TERTIARY AMINE CATALYST

[75] Inventors: Paul E. Eckler; William A. Summers, both of Terre Haute, Ind.; Ollie W. Chandler, Kildeer, Ill.

[73] Assignee: International Minerals & Chemical Corporation, Terre Haute, Ind.

[21] Appl. No.: 182,243

[22] Filed: Aug. 28, 1980

Related U.S. Application Data

[63] Continuation-in-part of Ser. No. 79,845, Sep. 8, 1979, abandoned.

[51] Int. Cl.³ .................... C08G 18/14; C08G 18/18; C07C 87/18; C07C 87/20
[52] U.S. Cl. .................................. 521/129; 528/53; 564/511; 564/512
[58] Field of Search .................... 521/129; 528/53

[56] References Cited

U.S. PATENT DOCUMENTS 2,987,547  6/1961  Mahan ............................... 564/453
4,212,952  7/1980  Murphy et al. .................... 521/129

Primary Examiner—H. S. Cockeram
Attorney, Agent, or Firm—Robert H. Dewey

[57] ABSTRACT

A method of catalyzing the curing of polyurethane foams formed by reacting a polyol with a diisocyanate in the presence of a blowing agent and a catalyst comprising using as the catalyst a compound of the formula

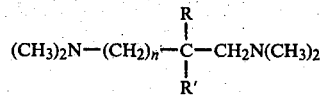

where n is 0 or 1, R is methyl or ethyl and R' is hydrogen, methyl of dimethylamino.

4 Claims, No Drawings

METHOD FOR POLYURETHANE FOAM USING A TRI-TERTIARY AMINE CATALYST

CROSS-REFERENCE TO RELATED APPLICATIONS

This application is a continuation-in-part of applicants' copending application Ser. No. 079,845 filed Sept. 8, 1979, now abandoned.

BACKGROUND OF THE INVENTION

This invention relates to di-tertiary amines.

In a particular aspect, this invention relates to a tetramethyl-substituted amine useful as a catalyst for preparing polyurethane foam.

Catalysts for curing polyurethane foams prepared from isocyanates and polyols to produce rigid objects are well-known and are used commercially in large quantities. Such catalysts should be free from hydroxy groups and primary and secondary amine groups because these groups are reactive with the isocyanates. In addition to being non-reactive, a suitable catalyst should promote curing at a rapid rate. While several stages of curing are involved, the most important is the time required to produce a firm foam, for that determines the length of time the foam remains in the mold, and hence the production rate for any given mold. Presently used catalysts, while satisfactory, are expensive and consequently a catalyst having a lower cost or lower firm time is needed in the art.

SUMMARY OF THE INVENTION

It is an object of this invention to provide a di-tertiary diamine.

It is another object of this invention to provide a tetramethyl-substituted diamine.

It is another object of this invention to provide a catalyst for the production of polyurethane foams.

Other objects of this invention will be apparent to those skilled in the art.

It is the discovery of this invention to provide a method of catalyzing the curing of polyurethane foams foamed by reacting a polyol with a diisocyanate in the presence of a blowing agent and a catalyst comprising using as the catalyst a polyamine compound of

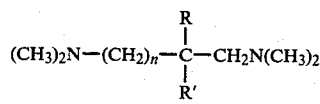

where n is 0 or 1, R is methyl or ethyl and R' is hydrogen, methyl or dimethylamino.

DETAILED DISCUSSION

According to the method of the present invention, a polyamine of the above formula is mixed with the ingredients used to form the foam shortly before the foamed article is to be manufactured. Preferably, the polyamine is mixed with the polyol and since no reaction takes place, the mixture can be prepared as far in advance as is desirable. The mixture can also contain other additives as is known in the art. The amount of polyamine used varies from about 0.1 to about 2% based on the polyol. For rigid foams, about 1.0 to 2.0 parts per 10 parts of polyol yields excellent results and for flexible foams, about 0.1 to 0.5% is preferred.

The formulation of mixtures for producing polyurethane foams is well-known in the art and forms no part of the present invention. The polyamines of the present invention can be used with any known foam-producing formulation.

The preferred compounds for the practice of this invention include but are not limited to 2-Methyl-N,N,N',N'-tetramethylpropanediamine, hereinafter referred to as PMT;

2-Heptamethyl-N,N,N',N',N",N"-1,2,3-propanetriamine, hereinafter referred to as P-2334;

N,N,N',N'-tetramethyl-1,2-butanediamine, hereinafter referred to as P-2336;

N,N,N',N'-tetramethyl-1,2-propanediamine.

The polyamine compounds of the present invention, are readily prepared by processes known in the art. Their preparation is given in the examples, but in general can be effected as follows, using PMT for illustration. According to one process, PMT can be prepared from 2-methyl-1,2-propanediamine, which is a known compound described by H. G. Johnson, U.S. Pat. No. 2,408,172. This compound is prepared by reacting 2-nitropropane, formaldehyde and ammonia in the presence of hydrogen and a reduction catalyst at elevated temperature and pressure. The PMT is then prepared by reductive methylation of 2-methyl-1,2-propanediamine. According to this method, the diamine is reacted with formic acid and formaldehyde to produce the tetra-methyl derivative, namely PMT. The crude diamine is acidified with a mineral acid, e.g. hydrochloric acid, then methanol is added and the mixture is evaporated, thus freeing it of excess formaldehyde and formic acid. The amine hydrochloride is then reacted with caustic, e.g. sodium hydroxide and the free amine is recovered by distillation. PMT can also be prepared by methylation of the diamine using formaldehyde in the presence of hydrogen and a reduction catalyst, such as Raney nickel.

According to the other process, PMT is prepared from 2-nitro-1-dimethylamino-2-methylpropane, designated NDAMP for convenience. The latter compound is known from Senkus, U.S. Pat. No. 2,419,506 which is incorporated herein by reference. The nitroamine can be easily prepared, preferably by reacting 2-nitropropane, dimethylamine and formaldehyde in about an equimolar ratio at about 45°–50° C. Alternatively, the nitroamine can be prepared by reacting dimethylamine with 2-nitro-2-methyl-1-propanol.

PMT is prepared from NDAMP by a two-stage process. The NDAMP is first reduced to the diamine as known in the art, e.g. by hydrogenation in the presence of a hydrogenation catalyst, such as Raney nickel. The diamine can be separated from the reaction mixture if desired, but generally it is subjected to reductive alkylation without separation. The reductive alkylation is conducted by art-recognized processes by reacting the diamine with formaldehyde in the presence of a hydrogenation catalyst, preferably at elevated temperature of about 115° C. and pressure of about 600 psi of hydrogen. The diamine is isolated by distilling off low boilers, then fractionating the crude amine, preferably at reduced pressure.

It is an embodiment of this invention to provide a process for the recovery of PMT from a reaction mixture containing it. PMT forms an azeotrope with water having a boiling point of 96° C. Water is formed during the reaction. The azeotrope is composed of approximately 44% water and 56% PMT and thus recovery of PMT in a relatively anhydrous state by distillation cannot be readily achieved. However, it has been surprisingly discovered that the solubility of PMT in water, 57 g/100 ml at 25° C., greatly diminishes at elevated temperatures so that at the boiling point of the azeotrope, PMT is soluble only to about 3% in water.

According to the recovery process of this invention, the reaction mixture is filtered to separate the catalyst. Methanol and other low-boiling fractions are removed by distillation up to about 80° C. The mixture is then heated to reflux at which time the heat is removed to allow separation into two phases, a PMT phase, upper, and an aqueous phase, lower. The layers are separated by decantation.

The PMT layer contains about 3.5–4.0% water and can be used as is for some purposes where the water is insignificant. However, it is undesirable for use in preparing polyurethane foams, so preferably the PMT layer is distilled under vacuum to minimize water content. The azeotrope boils at about 46° C. at 100 mm whereas anhydrous PMT boils at about 90°–92.5° C. at 100 mm.

The water layer from the decantation contains appreciable dissolved PMT. It can be recovered as the azeotrope which can be separated as before.

The formaldehyde used in the practice of this invention can be an aqueous solution of 37% or more, or preferably it is an alcoholic, e.g. methanolic, solution. Paraformaldehyde is also a suitable source of formaldehyde. A mixture of aqueous and alcoholic solutions can also be used. The alcohol solution lowers the amount of water present in the reaction and tends to simplify recovery procedures.

The invention will be better understood with reference to the following examples. It is understood that the examples are intended only to illustrate the invention and it is not intended that the invention be limited thereby.

EXAMPLE 1

2-Methyl-1,2-propanediamine 30.6 g (0.35 mole) was delivered to a reaction vessel containing 88% formic acid 182 g (3.48 moles) with cooling. To this mixture was added 37% formaldehyde 124 g (1.53 moles). The mixture was heated at reflux for sixteen hours, then cooled. The mixture was then acidified with concentrated hydrochloric acid (0.72 mole). The solution was concentrated by evaporative distillation on a steam bath for six hours, then 250 ml of methanol was added and allowed to evaporate to remove residual formaldehyde and formic acid. Toluene was added and evaporated to remove traces of water. The amine hydrochloric was obtained as solid mass. It was broken and triturated with 50% aqueous sodium hydroxide. There was obtained a two-phase liquid system. The upper layer was decanted and the lower layer was extracted three times with 100 ml portions of ether. These portions were combined, dried over MgSO$_4$ and distilled. The cut distilling at 135°–151° C. was taken as the product, yield 43.12 g (86% of theory). It was redistilled to obtain a purified sample. The nuclear magnetic resonance and infrared spectra were consistent with the proposed structure. Also the carbon, hydrogen and nitrogen analyses were consistent with those of the expected compound.

The product, PMT, was tested as a rigid polyurethane foam catalyst and compared with a widely-used commercial catalyst, N,N-dimethylcyclohexylamine. The following formulation was used:

|  | Control | Test |
| --- | --- | --- |
| Polyol | 100 parts | 100 parts |
| Silicone Surfactant | 1 | 1 |
| Tin Carboxylate | 0.05 | 0.05 |
| N,N-Dimethylcyclohexylamine | 1.5 | — |
| PMT | — | 1.5 |
| Fluorcarbon blowing agent | 35 | 35 |
| Isocyanate | 130 | 130 |

The following observations were made:

|  | Control | Test |
| --- | --- | --- |
| Cream time | 12 sec | 18 sec |
| Set time | 29 | 45 |
| Tack-free time | 43 | 64 |
| Rise time | 74 | 82 |
| Firm time | 500 | 240–270 |

Although the PMT acted more slowly at the start than the commercial catalyst, the foam reached the desired firmness in about half the time required for the dimethylcyclohexylaminecatalyzed foam. Since this represents time in the mold, it is highly significant.

EXAMPLE 2

In a 3 liter 3-neck round bottom flask with overhead stirring, thermometer in solution, dropping funnel and reflux condenser were combined 910 g of 37.2% formaldehyde (11.28 moles) and 1000 g of 2-nitropropane, 2-NP (11.24 moles). Then 871 g of 60% aqueous dimethylamine (11.61 moles) was added dropwise over about an hour while cooling the reaction mixture in ice so that the temperature did not exceed 30° C. The ice bath was then replaced with a warm water bath and the reaction mixture was warmed gently and held at 45°–50° C. for a total of six hours. The reaction mixture was then transferred to a separatory funnel and allowed to stand overnight. The lower aqueous layer was discarded. The cloudly upper layer of crude 2-nitroisobutyldimethylamine was retained for the subsequent reduction steps.

Raney nickel, 25 g, and 200 ml methanol were combined in a stirred autoclave, which was purged twice with hydrogen at 100 psi, and then pressurized to 600 psi and heated to 80° C. Crude 2-nitroisobutyldimethylamine, 292 g, was delivered and reduced over a 2.5 hour period. The temperature of the autoclave was increased to 115° C. and 223 g of 54.34% formaldehyde in methanol was added and the hydrogenation was continued for five hours additional. The autoclave was cooled and vented, and the catalyst was filtered off and washed thoroughly with methanol. The filtrate and washings totaled 925.85 g which by analysis contained 27.82% PMT. The yield based on 2-NP was 88.4%.

To recover the product a total of 913.9 g of the filtrate was distilled through a four foot Penn State column at 2:1 reflux ratio. Recovered methanol (497.30 g) was taken as a fraction bp 63.5°–77° C. and contained 1.2% low molecular weight amines calculated as dimethylamine. The pot contents were then refluxed (bp 96°–98° C.) for thirty minutes and transferred to a separatory funnel. The lower aqueous layer (171.3 g) was separated and found to contain 3.18% PMT representing 1.9% yield loss. It was recovered by stripping the PMT-water azeotrope from the water layer.

The upper layer (269.75 g) contained 93.5% PMT and 3.84% water, for an overall yield of 87.7% PMT based on 2-NP.

The final product was recovered by distillation through a four foot Penn State column at 2:1 reflux ratio at 100 mm. A 258.9 g sample of the above crude PMT was distilled. Fractions were collected as follows:

|  | bp | Weight | % PMT | % H$_2$O | % PMT Yield |
|---|---|---|---|---|---|
| PMT-water azeotrope | 46–56 | 21.3 g | 49.73 | 33.47 | 3.9 |
| Mid-fraction | 56–88 | 2.1 g | 50 | 1.57 | 0.4 |
| PMT product | 88–92.5 | 202.4 g | 98.55 | 0.41 | 72.6 |
| Column Drainings |  | 31.9 g |  |  |  |

EXAMPLE 3

The experiment of Example 2 was repeated in all essential details except that 1-nitropropane was substituted for 2-nitropropane. There was obtained 1,2-N,N,N',N'-tetramethylbutanediamine, designated P-2336 for convenience. It gave excellent results when tested as a catalyst for both rigid and flexible polyurethane foams.

EXAMPLE 4

The experiment of Example 2 is repeated in all essential details except that nitroethane is substituted for 2-nitropropane on an equimolar basis. There is obtained N,N,N',N'-tetramethylpropanediamine. It is very effective as a catalyst for both flexible and rigid polyurethane foams.

EXAMPLE 5

I. Preparation of 1,3,5-trimethyl-5-nitro hexahydropyrimidine.

In a 12 liter Morton flask was charged 2160 g (16 M) of 2-nitro-2-methyl-1,3-propanediol (NMPD) crystals, and 1200 ml of water. This slurry was heated with agitation to 35°–40° C. to achieve solution. Paraformaldehyde (93.5%) 563 g (17.6 M) was added and the slurry was stirred at 35°–40° C. for 30 minutes. Then 2595 g of 40.15% solution of monomethylamine (1042 g, 33.6 M) was added slowly through a closed dropping funnel while holding the temperature at 35°–40° C. and maintaining good agitation. After addition the reaction mixture was slowly heated to 65°–70° C. and held there for five hours. The reaction mixture was then heated to 85° C. and 1300 g of Na$_2$SO$_4$ added. After the Na$_2$SO$_4$ had dissolved, the mixture was quickly transferred to a separatory funnel and the upper layer (product) separated while hot. Weight was 2932 g.

II. Preparation of 2,4,6-trimethyl-4-dimethylamino-2,6-diazaheptane.

To a five-gallon stirred autoclave was charged 5 liters of methanol and 250 g (wet weight) of Raney nickel. The autoclave was pressurized to 600 psig with H$_2$ and heated to 70° C.

A solution of 1750 g (10.1 moles on weight basis) of the crude 1,3,5-trimethyl-5-nitro hexahydropyrimidine, prepared above, was made in methanol to give a total volume of 3600 ml. This solution was pumped into the autoclave at 15 ml/min over four hours while holding the autoclave at 70° C. and 600 psig. After pumping, the system was held at 70° C. and 600 psig for one hour.

The autoclave temperature was then increased to 125° C. and 1810 g of a 54.75% solution of formaldehyde in methanol (990.9 g HCHO, 33.03 M) was diluted with methanol to a total volume of 2400 ml and was pumped into the autoclave at 10 ml/min over four hours while holding the autoclave at 125° C. and 600 psig. After pumping, the system was held at 125° C. and 600 psig for three hours. The autoclave was then cooled, discharged, and the Raney nickel removed by filtration.

Methanol was removed by distillation at 1 atm through a 48" Penn State column at 1 to 1 reflux ratio to a vapor temperature of 80° C. (liquid temperature 99° C.). The kettle contents were transferred to a separatory funnel and the organic phase separated while hot. The organic phase weighed 1647 g.

The organic phase was distilled through a short Vigreaux column at 10 mm. After removal of a small amount of low boilers, the product distilled at 75°–85° C. The distilled product weighed 1595.3 g and G.C. analysis indicated 94.5% N,N,N',N',N'',N''2-heptamethyl-1,2,3-propanetriamine for a yield of 84.4% based on crude 1,3,5-trimethyl-5-nitrohexahydropyrimidine. It was designated P-2334 for convenience. It gave excellent results when tested as a catalyst for both rigid and flexible polyurethane foams.

What is claimed is:

1. In the method of preparing a polyurethane foam by reacting a polyisocyanate with polyol in the presence of a blowing agent and a catalyst to promote the reaction, the improvement consisting of conducting the reaction in the presence of 2-heptamethyl-N,N,N', N',N'',N''-1,2,3-propanetriamine.

2. The method of claim 1 wherein the catalyst is present in a proportion of from 0.1 to about 2% based on the weight of the polyol.

3. The method of claim 1 wherein the catalyst is used in a proportion of from 1% to 2% based on the weight of the polyol.

4. The method of claim 1 wherein the polyurethane foam is a flexible foam and the catalyst is used in a proportion of from 0.1% to about 0.5% based on the weight of the polyol.

* * * * *

UNITED STATES PATENT AND TRADEMARK OFFICE
CERTIFICATE OF CORRECTION

PATENT NO. : 4,297,443

DATED : October 27, 1981

INVENTOR(S) : Paul E. Eckler et al

It is certified that error appears in the above-identified patent and that said Letters Patent are hereby corrected as shown below:

In the Abstract, last line, "of" should read -- or --

Column 4, line 42, "cloudly" should read -- cloudy --

Signed and Sealed this

Twenty-first Day of June 1983

|SEAL|

Attest:

DONALD J. QUIGG

Attesting Officer

Acting Commissioner of Patents and Trademarks